J. F. JOHNSON.
CAR FENDER.
APPLICATION FILED MAY 22, 1912.

1,056,551.

Patented Mar. 18, 1913.

2 SHEETS—SHEET 1.

Inventor
John F. Johnson.

Witnesses

By Joshua R. H. Potts
Attorney

COLUMBIA PLANOGRAPH CO., WASHINGTON, D. C.

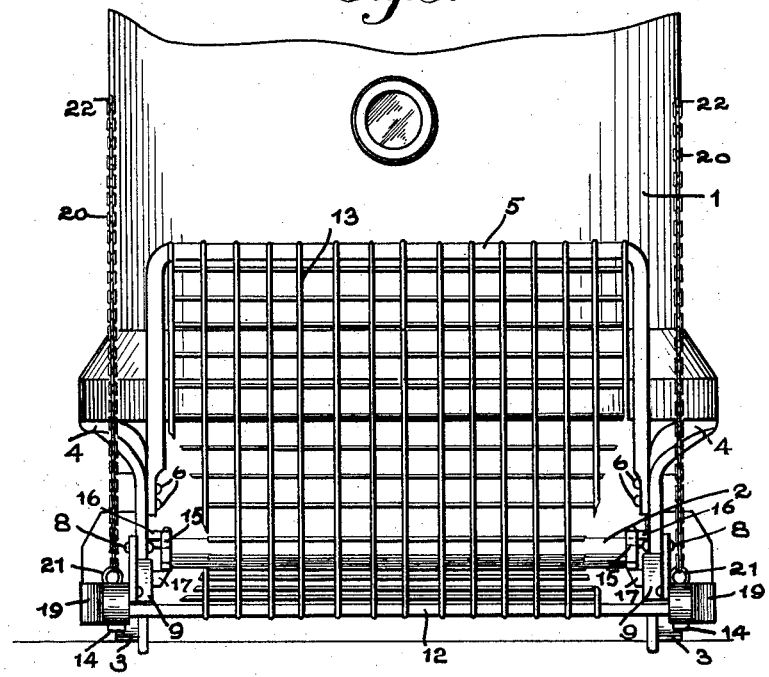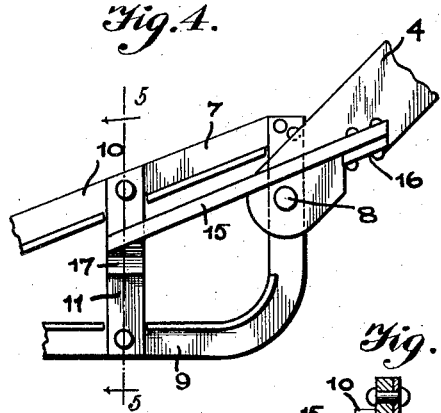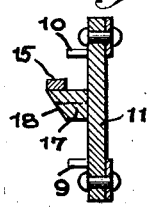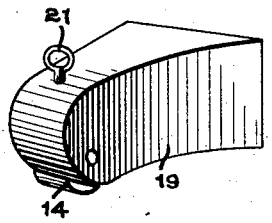

UNITED STATES PATENT OFFICE.

JOHN FREDERICK JOHNSON, OF PHILADELPHIA, PENNSYLVANIA.

CAR-FENDER.

1,056,551.        Specification of Letters Patent.      Patented Mar. 18, 1913.

Application filed May 22, 1912. Serial No. 698,873.

*To all whom it may concern:*

Be it known that I, JOHN F. JOHNSON, a citizen of the United States, residing at Philadelphia, in the county of Philadelphia and State of Pennsylvania, have invented certain new and useful Improvements in Car-Fenders, of which the following is a specification.

My invention relates to improvements in car fenders, the object of the invention being to provide a car fender which is maintained at a uniform level above the track, and which is prevented from injury when striking the track by reason of its pivotal mounting, and yet is normally maintained in close relationship with the track by suitable elastic means.

A further object is to provide a fender with improved wheel or roller guards at the forward corners of the fender, whereby a person or object will be deflected to one side of the fender if not picked up by the fender.

With these and other objects in view, the invention consists in certain novel features of construction and combinations and arrangements of parts, as will be more fully hereinafter described and pointed out in the claims.

Figure 1:
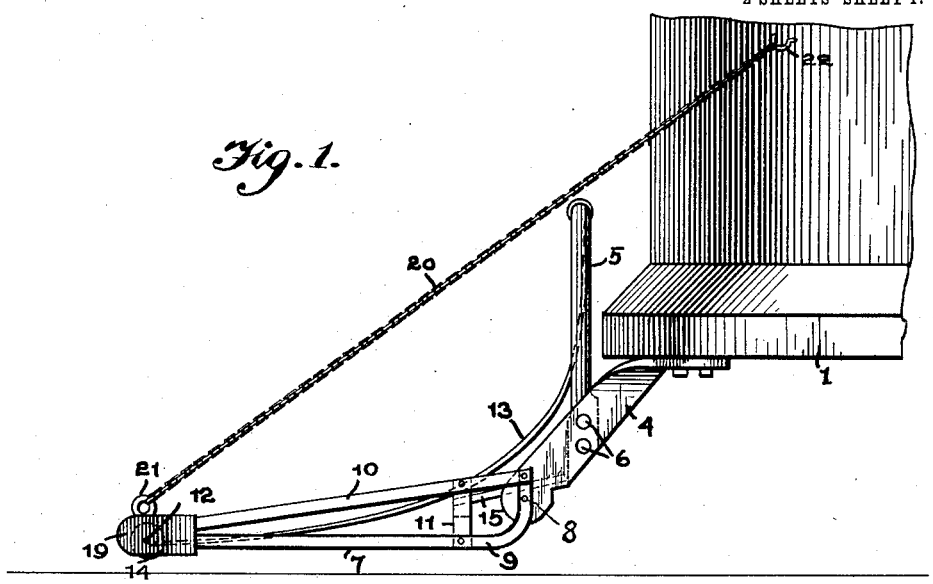
Figure 2:
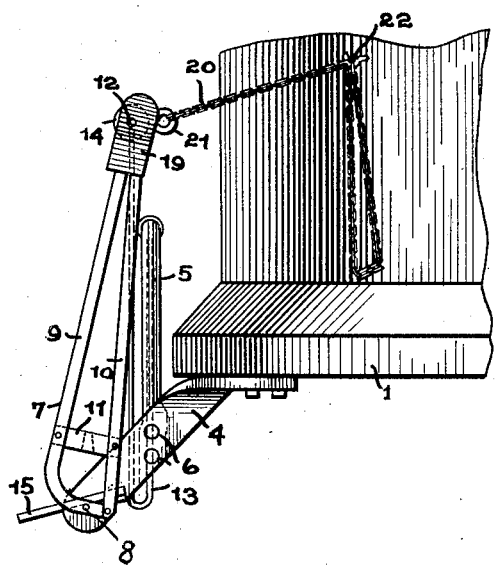

In the accompanying drawings: Figure 1 is a view in side elevation illustrating my improved fender in normal position. Fig. 2 is a similar view showing the fender tilted to an upright position when not in use. Fig. 3 is a view in front elevation with the fender in its lowered normal position, showing parts of the rope netting cut away to illustrate features of construction in rear thereof, and in this view the axle and wheels of the car are illustrated to show their relationship with the fender. Fig. 4 is a fragmentary view on an enlarged scale showing manner of connecting the fender with its support, and the spring holding the fender in its lowered position. This view is taken from inside the fender looking toward the left of Fig. 3 with parts removed which might obstruct the disclosure. Fig. 5 is a view in section on the line 5—5 of Fig. 4. Fig. 6 is a perspective view of one of the roller guards showing the roller therein.

1 represents a car, and in Fig. 3 the axle 2 and wheels 3 are illustrated to show their relative position. To the bottom of car 1, forwardly and downwardly projecting twisted bars 4 are secured. These bars are connected by an arched bar 5, the latter being fixed to bars 4 by rivets 6, so that said bars are rigidly connected and form a strongly braced structure.

To the lower forward ends of bars 4, my improved fender 7 is connected by pivots 8. The side members of the fender 7 are composed of angle bars 9 and 10, which are secured together at their forward ends, and when in normal position, the lower bars 9 are substantially horizontal, while the upper bars 10 are at an acute angle relative thereto.

The rear ends of the bars 9 are bent or curved upwardly and secured to bars 10, so that a strong openwork side member of the fender is provided. These bars 9 and 10 are connected near their rear ends by vertical bars 11, and a transverse rod 12 connects them at their forward ends. This rod 12 is connected with the bar 5 by a rope or other suitable netting 13, so that a hammock-like receptacle is formed to receive the person or the object which may be deposited thereon.

The rod 12 extends beyond the sides of the fender proper, and its ends act as journals upon which rollers 14 are mounted. These rollers 14 are adapted to strike the track, if the forward end of the fender falls, or as frequently happens, when a car reaches the bottom of a grade and begins to ascend so as to avoid the forward end of the fender striking the track and bouncing upwardly. This happening frequently injures the fender. With my improvements the rollers 14 would strike the track and the fender would be prevented from bouncing upwardly by reason of springs 15. These springs 15 are secured to lugs 16 formed on the inner faces of the bars 4, and at their free ends are normally positioned above the blocks 17 on the bars 11. While the upper faces of these blocks 17 are inclined in accordance with the inclination of the spring, their side faces are also inclined as seen most clearly at 18 in Fig. 5.

The inclined faces 18 of the blocks 17 will, when the fender is lowered from its folded position engage the side edges of the springs and force the springs laterally, allowing the blocks to pass. When the blocks are completely lowered, the spring will be in a sufficiently high plane to spring over the upper edge of the blocks. It will therefore be noted that the beveled faces 18 cause the springs to bend laterally during the lowering of the fender and the springs move over the top of the blocks when the fender reaches its normal position. In other words, this construction allows the fender to be pivoted without manually manipulating the springs.

The rollers 14 above referred to are mounted in casings 19 which constitute guards. These casings have their outer walls beveled or flaring outwardly from their forward to their rear ends, so that in the event a person or object is struck by the corner of the fender, such person or object will not come in contact with the roller 14, but will be deflected to one side of the track out of the way of the wheels of the car. Chains 20 are connected to eyes 21 on the casings or guards 19, and at their other ends are connected to hooks 22 on the car 1. The chains therefore act as supports to prevent the fender from moving downwardly and will, of course, support the weight of a person or object on the fender. They will permit the fender to move upwardly if the rollers 14 should strike the track as above pointed out, but this movement will be very limited as the springs 15 will tend to hold the fenders against a bouncing or pivotal action.

When the fender is not desired for use, it may be swung upwardly as shown in Fig. 2, and held in this position by means of the chains 20 as shown.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with supporting bars, of a fender pivotally connected to said bars, blocks on said fender in front of the pivotal connection between the fender and the bars, and springs secured to said bars and normally bearing at their free ends upon said blocks, substantially as described.

2. The combination with supporting bars, of a fender pivotally connected to said bars, blocks on said fender, springs secured to said bars and normally bearing at their free ends upon said blocks, said blocks having beveled or inclined lower faces, whereby, when said fender is being lowered, said beveled faces will cause the springs to be deflected laterally to allow the blocks to pass, substantially as described.

In testimony whereof I have signed my name to this specification in the presence of two subscribing witnesses.

JOHN FREDERICK JOHNSON.

Witnesses:
R. H. KRENKEL,
CHARLES E. POTTS.

---

Copies of this patent may be obtained for five cents each, by addressing the "Commissioner of Patents, Washington, D. C."